July 1, 1969     C. A. MARKLEY     3,452,605
WHEEL BALANCING INSTRUMENT
Filed March 11, 1966
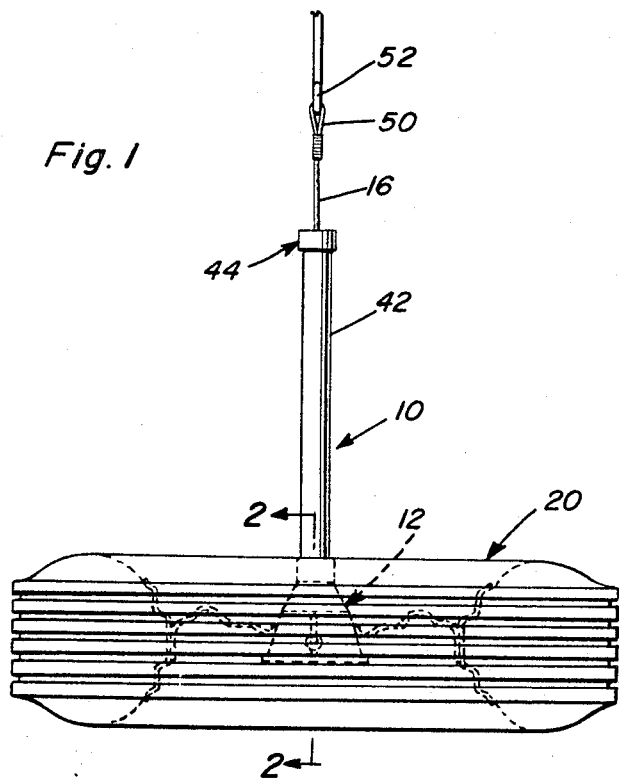
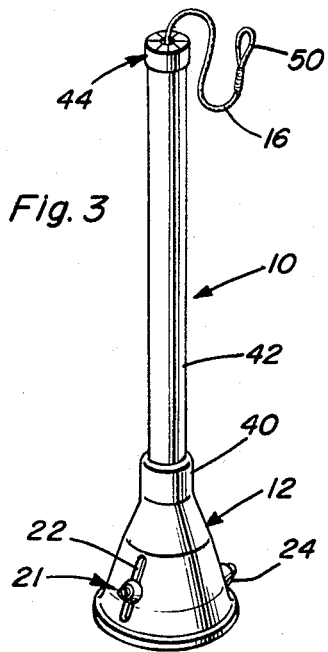
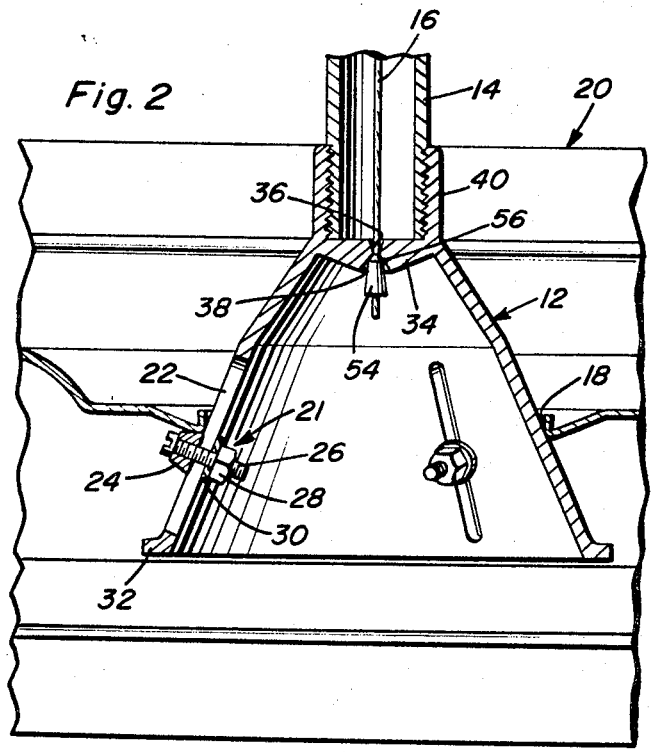
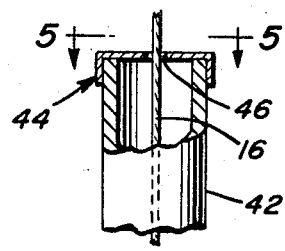
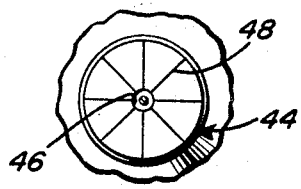
Clarence A. Markley
INVENTOR.

United States Patent Office 3,452,605
Patented July 1, 1969

3,452,605
WHEEL BALANCING INSTRUMENT
Clarence A. Markley, Oak St., Packerton, Pa. 18235
Filed Mar. 11, 1966, Ser. No. 533,674
Int. Cl. G01m 1/68
U.S. Cl. 73—486             11 Claims

ABSTRACT OF THE DISCLOSURE

A wheel balancing instrument including an elongated suspension cable having a conically shaped wheel mount pivotally mounted on the lower end thereof. The cable is surrounded by a tubular extension from the wheel mount which surrounds the cable. The upper end of the tubular extension is provided with an apertured cap having aligning lines radially defined thereon so as to gauge the imbalance of a wheel supported on the wheel mount. Three vertically adjustable positioning members are provided on the wheel mount for horizontally orientating the wheel thereon.

---

The instant invention relates to new and useful improvements in wheel balancing instruments, and is more particularly concerned with the provision of a wheel balancing device in the nature of a unique, although structurally simple, wheel suspension and balancing tool.

It is a primary object of the instant invention to provide a static wheel balancer which utilizes a wheel mounting unit pivotally mounted on a freely hung suspension cable in a manner whereby any wheel imbalance will be automatically indicated by the pivotal relationship of the mounting structure to the suspension cable.

In conjunction with the above object, it is also a significant object of the instant invention to provide a wheel balancing instrument whereby access can be freely had to all portions of the wheel for an addition of the appropriate weights thereto so as to bring the wheel into balance, the achievement of the proper balance being immediately indicated through an assumption of a predetermined position by the wheel mounting unit relative to the suspension cable.

Another significant object of the instant invention is the provision of a wheel balancer which is adapted to accommodate a wide range of different size wheels, with each wheel being properly seated thereon so as to insure a consistent operation of the instrument.

Basically, in achieving the above objects, the wheel balancing instrument of the instant invention is to include an elongated suspension cable having a depending conically shaped housing or wheel mount pivotally mounted on the lower end thereof for pivotal movement relative to the cable. The cable in turn is surrounded by a vertically elongated tubular extension of the wheel mount with the upper end of the tubular extension having an aligning cap thereon provided with a central aperture of a diameter larger than that of the cable, as well as a plurality of aligning or gauging lines projecting radially outward from the central aperture or hole. The wheel, upon being mounted upon the mount, is engaged therewith at the appropriate height along the conical surface thereof with the horizontal orientation of the wheel being insured by three vertically adjustable positioning nuts. Any imbalance in the wheel will result in a corresponding pivoting of the mount and extension tube on the vertically positioned suspension cable, with this in turn being registered through a movement of the cap bearing upper end of the tube into engagement with the cable projecting through the central hole therein. A balancing of the wheel is achieved through the addition of appropriate weights sufficient so as to effect a pivoting of the mount to position the suspension cable centrally through the aligning cap aperture and out of contact with the surrounding edge thereof, the positioning of the weights being facilitated by the radially projecting aligning or gauging lines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the wheel balancing instrument in use;

FIGURE 2 is an enlarged partial cross-sectional view taken substantially on a plane passing along line 2—2 in FIGURE 1;

FIGURE 3 is a perspective view of the wheel balancer;

FIGURE 4 is a detailed view of the upper end of the extension tube with the aligning cap mounted thereon; and FIGURE 5 is a partial top plan view taken substantially on a plane passing along line 5—5 in FIGURE 4 and illustrating the aligning cap as well as the balanced relationship of the suspension cable therewith.

Referring now more specifically to the drawings, reference numeral 10 is used to generally designate the wheel balancer or wheel balancing instrument comprising the instant invention. The balancer 10 includes an enlarged generally conically shaped wheel receiving and mounting member or mount 12, a vertically elongated tubular extension 14 fixed to the truncated upper end of the mount 12 and projecting vertically thereabove, and an elongated flexible suspension cable 16 projecting through the extension tube 14 and pivotally mounting the mounting member 12 at the lower end thereof.

The mount 12, when utilizing the device 10, is positioned through the centrally located hub opening 18 of a wheel 20 with the generally conical shape of the mount 12 enabling the accommodation of a wide range of different size tires 20. In order to insure a proper horizontal seating of the tire 20 on the mount 12, it is contemplated that three positioning units 21 be provided at equally spaced points about the mount 12. Each of these units includes a vertically elongated slot 22 within the wall of the mount 12, a positioning nut 24 in the shape of a truncated cone, a positioning lug 26, and a locking nut 28 along with a suitable washer 30 if deemed necessary. The positioning lug 24, engageable against the outer surface of the mount 12, is to have a taper, peripherally thereabout, which is such so as to orientate the upper surface of the positioning nut 24 horizontally so as to receive the annular portion of the wheel 20 which defines the hub opening 18. Further, inasmuch as the positioning nut 24 is conical in shape, there will be no necessity of rotationally positioning the nut 24 so as to provide a horizontally bearing surface in that any upwardly directed portion of the nut 24 will provide the surface. As will be readily appreciated from the drawings, the mount 12 itself is of course hollow and consists of a conical shell or wall which can be peripherally reinforced about the base by an outwardly projecting integrally formed flange 32, and, if deemed desirable, by a plurality of internal ribs (not illustrated). The truncated upper end of the mount 12 is closed by a horizontal top wall 34 which includes a central cable accommodating passage 36 therethrough. The lower portion of the passage 36 is conically enlarged so as to define a downwardly directed tapered seat 38 with the surrounding portion of the top wall being suitably thickened or strengthened. By the same token, the upper portion of the passage 36 also includes a slight conical enlargement so as to allow for the free pivoting of the mount 12 in a manner which shall be described presently.

Projecting upwardly from the truncated top 34 of the mount 12 is an internally threaded cylindrical boss 40 within which the lower end of the vertically elongated hollow cylindrical extension tube 42 is threadedly locked. Incidentally, if so desired, the tube portion 42 can be formed as an integral part of the mount 12. The upper end of the extension tube 42 is closed by an aligning cap 44 received thereover. The aligning cap 44 has a centrally located aperture or hole 46 therethrough in longitudinal alignment with the cable passage 36 in the top wall 34 of the mount 12. In addition, the aligning cap 44 includes a plurality of radially extending aligning or gauging lines 48 projecting outwardly from the central opening 46 at circumferentially spaced points thereabout, these lines 48 preferably being arranged in pairs of diametrically opposed lines.

The suspension cable 16, preferably in the form of a thin flexible steel cable, extends centrally through the cap opening 46, extension tube 42, and top wall passage 36 with the upper end of the cable 16 having a hanging loop 50 thereon for releasable engagement with a suitable overhead support or hook means 52. The lower end of the cable 16, that portion of the cable located within the mount 12 below the top wall 34 thereof, has an enlarged balance member 54 suitably clamped or formed thereon. This balance member 54, including preferably a conical upper end 56, is freely seated within the seat portion 38 of the cable passage 36 whereby a pivotal supporting of the mount 12 and extension tube 42 on the cable 16 is achieved. In this manner, it will be recognized, that upon an engagement of the cable loop with an overhead support 52 so as to enable the entire unit 10 to freely depend or be suspended therefrom, the perfectly balanced unit will result in the cable 16 passing through the aligning cap hole 46, which incidentally is of sufficiently greater diameter than the diameter of the cable 16 so as to enable one to readily ascertain the specific relationship of the cable 16 to the hole 46 and the surrounding edge thereof, centrally therein and out of engagement with the surrounding edge. By the same token, any imbalance in the mount, due to an imbalance in the wheel 20, will result in a tipping of the mount and extension tube 42 in a manner so as to engage a portion of the edge of the aligning cap hole 46 against the cable 16. Thus, it will be appreciated that an extremely delicate instrument is provided, notwithstanding the basic structural simplicity.

In using the balancer 10, the wheel 20 will be slipped over the upper end of the extension tube 42 and horizontally seated on the mount 12. After being so seated, the positioning lugs 26 can be adjusted so as to engage the positioning nuts 24 with the wheel 20 so as to maintain the position of the wheel 20. Conversely, if so desired, the locating lugs 26 can be adjusted prior to the mounting of the tire 20, the proper positioning of the lugs 26 and nuts 24 being facilitated, if deemed necessary, by suitable gauge marks provided on the mount 12. After the tire 20 has been properly engaged with the mount 12, the entire device is suspended from a suitable overhead support 52 by an engagement of the upper end of the cable 16 therewith. At this point, any imbalance in the tire 20 will be readily apparent from a viewing of the aligning cap 44, and more particularly the relationship of the cable 16 to the edge of the cable receiving hole 46. The cap lines 48 will be of value in determining the imbalance present and in assisting in the proper location of the weights necessary to balance the wheel 20. Upon a pivoting of the mount 12 and tube 42, under the influence of the added weight, so as to center the suspended cable 16 within the hole 46, it will be appreciated that a balanced tire has been achieved.

It will of course be appreciated that the balancer 10 is to be made with precision and in a manner whereby the mount 12 and extension tube 42 will be perfectly balanced in the absence of the presence of a wheel 20 thereon. Further, the relatively great length of the extension tube 42 is of significance in providing a device wherein any imbalance will be readily discernible, this elongated extension tube 42 also incidentally providing a convenient handle or gripping means for mounting and dismounting the balancer 10 when a wheel 20 is loaded thereon. With reference to FIGURE 1, it will be noted that the tire 20 is preferably positioned on the mount 12 in a manner whereby the point of pivotal mounting of the mount 12 on the cable 16 is well above a major portion of the weight of the tire 20, thus in effect suspending the tire 20 from the mount 12 which in turn will tend to have the effect of stabilizing the tire 20 on the mount 12 to a substantially greater degree than would be in the case where the major portion of the weight of the tire is above the point. As such, the location of the pivotal engagement between the mount 12 and cable 16 above the tire engaging portion of the mount 12 is deemed particularly significant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed:

What is claimed as new is as follows:

1. A wheel balancer comprising a vertically elongated suspension member, a wheel mount surrounding and centrally receiving the lower portion of the suspension member, means pivoting balancing and supporting said mount on said suspension member for pivotal movement of said mount relative to said member upon introduction of an unbalanced load, a vertically elongated extension fixed to said mount for pivotal movement therewith, said extension projecting vertically above said mount adjacent said suspension member, said extension including a circular aperture defining portion at the upper end thereof receiving said suspension member centrally and freely therethrough under balanced conditions and engaging said suspension member upon a pivotal movement of said mount and extension, said mount including wheel positioning means, said wheel positioning means being located below said means supporting said mount on said suspension member whereby a suspension of a wheel from said suspension member will be effected, said wheel positioning means comprising a conical exterior on said mount capable of accommodating, at vertically spaced points therealong, a plurality of different size wheels, said positioning means further including a plurality of wheel supporting positioning nuts peripherally spaced about said mount, said nuts being vertically adjustable along the exterior of said mount and releasably lockable in an adjusted position so as to engage beneath a mounted wheel.

2. The balancer of claim 1 wherein said suspension member comprises an elongated flexible cable, and means on the upper end of said cable selectively engageable with an overhead support.

3. The balancer of claim 2 wherein said mount includes a top defining a centrally located vertical passage, the lower end of said passage being radially enlarged and defining a balance seat, said cable extending through said passage, and a balance member fixed to the lower end of said cable and pivotally engaging in said seat.

4. The balancer of claim 3 wherein said extension comprises a cylindrical tube surrounding said cable.

5. The balancer of claim 4 wherein said circular aperture defining portion includes a plurality of aligning lines extending radially outward from the circular aperture.

6. The balancer of claim 1 wherein said mount includes a top defining a centrally located vertical passage, the lower end of said passage being radially enlarged and defining a balance seat, said suspension member extending through said passage, and a balance member fixed to the lower end of said suspension member and pivotally engaged in said seat.

7. The balance of claim 1 wherein each of said nuts is conical in shape with the taper thereof being such as to position the upper portion of the peripheral surface thereof horizontally upon engagement of the nut against the conical exterior of the mount.

8. A wheel balancer comprising a vertically elongated suspension member, a wheel mount surrounding and centrally receiving the lower portion of the suspension member, means pivotally balancing and supporting said mount on said suspension member for pivotal movement of said mount relative to said member upon introduction of an unbalanced load, said mount including wheel positioning means, said wheel positioning means including a generally conical exterior on said mount capable of accommodating, at vertically spaced points therealong, a plurality of different size wheels, said positioning means further including a plurality of wheel supporting positioning members peripherally spaced about said mount, said positioning members being independently vertically adjustable along and relative to the exterior of said mount and releasably lockable in an adjusted position so as to engage beneath a mounted wheel.

9. The balancer of claim 8 including a vertical extension on said mount for pivotal movement therewith, said extension projecting vertically above said mount in surrounding relation to said suspension member, said positioning members being mounted on threaded bolt-like members, said mount including a plurality of vertically elongated slots, said bolt-like members extending through said slots and being vertically adjustable therealong, and nut means engageable on said bolt-like members for selectively locking said bolt-like members along with the corresponding positioning members to said mount.

10. A wheel balancer comprising a vertically directed balance member, a wheel mount surrounding and centrally receiving the balance member for a pivotal balancing and supporting of the mount on the balance member, said mount including wheel positioning means, said wheel positioning means including a conical exterior on said mount capable of accommodating, at vertically spaced points therealong, a plurality of different size wheels, said positioning means further including a plurality of wheel supporting positioning members peripherally spaced about said mount, said positioning members being independently vertically adjustable relative to and along the exterior of said mount and releasably lockable in an adjusted position so as to engage beneath a mounted wheel.

11. The balancer of claim 10 wherein each of said positioning members is conical in shape with the taper thereof being such so as to position the upper portion of the peripheral surface thereof horizontally upon engagement of the positioning member against the conical exterior of the mount.

References Cited
UNITED STATES PATENTS

| 2,481,256 | 9/1949 | Sutton | 73—486 |
|---|---|---|---|
| 2,679,751 | 6/1954 | Pfeiffer | 73—484 |
| 2,698,537 | 1/1955 | Taylor et al. | 73—486 |
| 3,045,497 | 7/1962 | Lackie | 73—486 |
| 3,365,954 | 1/1968 | Levino | 73—484 |

JAMES J. GILL, *Primary Examiner.*

HERBERT GOLDSTEIN, *Assistant Examiner.*

U.S. Cl. X.R.

33—216